United States Patent
Leng et al.

(10) Patent No.: US 11,176,290 B1
(45) Date of Patent: Nov. 16, 2021

(54) APPROXIMATE PHYSICAL SIMULATION INTEGRATED DEBUGGING METHOD AND SYSTEM BASED ON DIGITAL TWINNING

(71) Applicant: GUANGDONG UNIVERSITY OF TECHNOLOGY, Guangzhou (CN)

(72) Inventors: Jiewu Leng, Guangzhou (CN); Man Zhou, Guangzhou (CN); Wenshun Deng, Guangzhou (CN); Qiang Liu, Guangzhou (CN); Lijun Wei, Guangzhou (CN); Duxi Yan, Guangzhou (CN); Yuxuan Xiao, Guangzhou (CN); Jiongyu Chen, Guangzhou (CN); Caiyu Xu, Guangzhou (CN); Yougui Yang, Guangzhou (CN)

( * ) Notice: Subject to any disclaimer, the term of this patent is extended or adjusted under 35 U.S.C. 154(b) by 0 days.

(21) Appl. No.: 17/308,969

(22) Filed: May 5, 2021

(30) Foreign Application Priority Data

Dec. 21, 2020 (CN) .......................... 202011518822.0

(51) Int. Cl.
*G06F 30/20* (2020.01)
*G06F 30/17* (2020.01)
*G06F 111/02* (2020.01)

(52) U.S. Cl.
CPC .............. *G06F 30/20* (2020.01); *G06F 30/17* (2020.01); *G06F 2111/02* (2020.01)

(58) Field of Classification Search
CPC ........ G06F 30/17; G06F 2111/02; G06F 8/71; G06Q 10/063
USPC .......................................... 703/2, 22, 26, 24
See application file for complete search history.

(56) References Cited

U.S. PATENT DOCUMENTS

| | | | | |
|---|---|---|---|---|
| 6,754,763 | B2 * | 6/2004 | Lin | ..................... G06F 15/7864 710/317 |
| 9,671,777 | B1 * | 6/2017 | Aichele | .................. B25J 9/1666 |
| 9,811,074 | B1 * | 11/2017 | Aichele | .................... G06N 7/04 |
| 10,877,470 | B2 * | 12/2020 | Burd | .................. G05B 23/0294 |
| 10,878,140 | B2 | 12/2020 | Snyder | |
| 2005/0071812 | A1 | 3/2005 | Ramkumar et al. | |
| 2015/0121346 | A1 | 4/2015 | Patel et al. | |
| 2018/0210436 | A1 * | 7/2018 | Burd | .................. G05B 23/0294 |

(Continued)

FOREIGN PATENT DOCUMENTS

| CN | 111063026 A | 4/2020 |
|---|---|---|
| CN | 111539583 A | 8/2020 |

*Primary Examiner* — Thai Q Phan

(57) ABSTRACT

Disclosed is an approximate physical simulation integrated debugging method based on digital twinning, which includes the following steps of: a production line simulation model building step, a twinning step, a system debugging step, a hardware-in-the-loop debugging step, and a device-in-the-loop debugging step. The approximate physical simulation integrated debugging system based on digital twinning includes a production line simulation model building module, a twinning module, a system debugging module, a hardware-in-the-loop debugging module, and a device-in-the-loop debugging module. According to the approximate physical simulation integrated debugging method and system based on digital twinning, since a local component twin after being successfully debugged is replaced with an entity component, when a problem occurs after replacement, only the local component twin needs to be debugged and optimized again, thus saving time and reducing cost.

10 Claims, 2 Drawing Sheets

(56) References Cited

U.S. PATENT DOCUMENTS

2018/0267496 A1* 9/2018 Wang .................. G06F 3/04815
2020/0150637 A1* 5/2020 Yates ................. G05B 19/4184
2021/0149655 A1* 5/2021 Mathews ............. G06Q 10/063

* cited by examiner

APPROXIMATE PHYSICAL SIMULATION INTEGRATED DEBUGGING METHOD AND SYSTEM BASED ON DIGITAL TWINNING

CROSS-REFERENCE TO RELATED APPLICATIONS

The present application claims foreign priority of Chinese Patent Application No. 202011518822.0, filed on Dec. 21, 2020 in the China National Intellectual Property Administration, the disclosures of all of which are hereby incorporated by reference.

TECHNICAL FIELD

The present invention relates to the field of automatic production line technologies, and more particularly, to an approximate physical simulation integrated debugging method based on digital twinning and a system thereof.

BACKGROUND

An existing automatic production line and device development mode is a serial mode from mechanical design and electric control design to software verification. Under the serial development mode, design problems at all levels will be exposed gradually only at a stage of integration and debugging, and even some system-level problems will be caused, resulting in functional integrity, control logic accuracy, and performance reliability of automation device failing to meet the production requirements, so that a system performance of a production line is reduced. At present, a method for debugging the production line includes putting a whole system into the production of an entity device after system simulation debugging is completely successful. However, the disadvantage of this method is that the production of the entity device should be started after debugging, and then the whole virtual part is replaced with the entity. If there is a problem after replacement, the virtual part should be debugged again, and then the entity device is improved again, thus prolonging a development period and increasing a cost.

SUMMARY

Aiming at the above defects, the present invention is intended to provide an approximate physical simulation integrated debugging method and system based on digital twinning. Since a local component twin after being successfully debugged is replaced with an entity component, when a problem occurs after replacement, only the local component twin needs to be debugged and optimized again, thus saving time and reducing cost.

In order to achieve the objective, the following technical solutions are used in the present invention. An approximate physical simulation integrated debugging method based on digital twinning includes the following steps of:

a production line simulation model building step: building local component simulation models according to model selection of a remote device in a production line, then forming all the local component simulation models into local device simulation models, and finally integrating all the local device simulation models to build a local production line simulation model;

a twinning step: generating a local production line twin by dynamically twinning the local production line simulation model, wherein a local component twin is generated by the local component simulation model, and a local device twin is generated by the local device simulation model;

a system debugging step: performing local off-line simulation debugging on the local production line twin by using process control of a local management and control system, marking the local component twin subjected to the local off-line simulation debugging, and then replacing the marked local component twin with a corresponding entity component;

a hardware-in-the-loop debugging step: building local communication between the local device twin and a local master control server, and obtaining a finally optimized control program by simulation debugging; and a device-in-the-loop debugging step: when all the local component twins are subjected to off-line simulation debugging and replaced with the corresponding entity components, building, by the remote device corresponding to the entity device composed of the entity components, communication with the local master control server through a remote controller, and issuing, by the local device twin, a corresponding sensing trigger signal to the remote device to execute an action, wherein the local device twin delays to transmit the sensing trigger signal, so that the local device twin acts ahead of the remote device.

For example, the production line simulation model building step specifically includes:

firstly, building general three-dimensional CAD models for key elements of an automatic production line according to the model selection of the remote device in the production line;

then, processing the general three-dimensional CAD model with larger numbers of vertices and patches by simplifying, replacing, or deleting to obtain a lightweight local component simulation model;

then, building a clear model hierarchical structure among the local component simulation models; and finally, according to device resource allocation, workshop layout planning, and process path planning, integrating all the local component simulation models and model hierarchical structures to form the local device simulation model;

the twinning step specifically includes:

firstly, generalizing and encapsulating the local device simulation model based on input and output control of a virtual controller, wherein the generalizing and encapsulating the local device simulation model includes: encapsulating a simulation motor assembly used for device driving, arranging device sensing simulation models matching the reality, and creating input and output trigger functions;

then, building a communication interface between the local device simulation model, and the local master control server and the local management and control system;

then, calibrating input and output ports of the local device simulation model by building communication with the virtual controller; and finally, preliminarily debugging a process control logic of the local management and control system, and finally forming the local production line twin.

It is worth noting that the system debugging step specifically includes:

firstly, performing simulation delivery and execution of an order on the local production line twin under process control of the local management and control system, so as to implement order delivery debugging and production process monitoring;

then, simulating executions of device remote fault diagnosis and maintenance by randomly generating a device fault in the local production line twin to implement fault detection debugging and processing; and finally, when the corresponding local component twin is subjected to the local off-line simulation debugging, replacing the local component twin with the corresponding entity component; and when the local component twin is not subjected to the local off-line simulation debugging, adjusting parameters of the local component twin again.

Optionally, the hardware-in-the-loop debugging step specifically includes:

firstly, selecting a model of the local master control server and a corresponding communication protocol, determining input/output devices and a point location address, and designing a control program;

then, burning the control program, building communication between the local device twin and the local master control server, and binding a point location;

then, determining a control requirement and configuring the control program through execution components and process parameters of the remote device;

then, formulating and operating a simulation experiment, driving the local production line twin through an instruction issued by the local master control server, and simulating process control of order delivery; receiving, by the local master control server, a sensing signal of each local component twin, and distributing and transmitting the signal to each remote controller through industrial Ethernet; after receiving the sensing signal, outputting, by the remote controller, an execution signal according to a control program logic and uploading the signal to the local master control server, and then forwarding, by the local master control server, the execution signal to the local component twin to execute model action control; and finally, after debugging and verification, obtaining the finally optimized control program.

Specifically, the device-in-the-loop debugging step specifically includes:

firstly, transmitting, by the local device twin, the sensing trigger signal to the local master control server, and forwarding, by the local master control server, the sensing trigger signal to the remote controller by using a virtual-real synchronization technology and an industrial Ethernet communication technology; and then, after receiving the sensing trigger signal, executing, by the remote controller, the control program logic, and issuing an actuator control signal to the remote device, and after receiving the actuator control signal, executing, by the remote device, an action;

wherein, the remote controller delays to issue the actuator control signal to the remote device, and eliminates delay of industrial Ethernet communication between the remote controller and the local master control server by a 5G technology.

For example, an approximate physical simulation integrated debugging system based on digital twinning includes a production line simulation model building module, a twinning module, a system debugging module, a hardware-in-the-loop debugging module, and a device-in-the-loop debugging module, wherein the production line simulation model building module is configured to build local component simulation models according to model selection of a remote device in a production line; is also configured to form all the local component simulation models into local device simulation models, and is also configured to integrate all the local device simulation models to build a local production line simulation model;

the twinning module is configured to generate a local production line twin by dynamically twinning the local production line simulation model; is also configured to generate a local component twin by the local component simulation model; and is also configured to generate a local device twin by the local device simulation model;

the system debugging module is configured to perform local off-line simulation debugging on the local production line twin by using process control of a local management and control system; is also configured to mark the local component twin subjected to the local off-line simulation debugging; and is also configured to replace the marked local component twin with a corresponding entity component;

the hardware-in-the-loop debugging module is configured to build local communication between the local device twin and a local master control server; and is also configured to obtain a finally optimized control program by simulation debugging; and the device-in-the-loop debugging module is configured to when all the local component twins are subjected to off-line simulation debugging and replaced with the corresponding entity components, build, by the remote device corresponding to the entity device composed of the entity components, communication with the local master control server through a remote controller; and is also configured to issue, by the local device twin, a corresponding sensing trigger signal to the remote device to execute an action, wherein the local device twin delays to issue the sensing trigger signal, so that the local device twin acts ahead of the remote device.

It is worth noting that the production line simulation model building module is specifically configured to build general three-dimensional CAD models for key elements of an automatic production line according to the model selection of the remote device in the production line;

is configured to process the general three-dimensional CAD model with larger numbers of vertices and patches by simplifying, replacing, or deleting to obtain a lightweight local component simulation model;

is configured to build a clear model hierarchical structure among the local component simulation models; and is configured to, according to device resource allocation, workshop layout planning, and process path planning, integrate all the local component simulation models and model hierarchical structures to form the local device simulation model;

the twinning module is specifically configured to generalize and encapsulate the local device simulation model based on input and output control of a virtual controller, wherein the generalizing and encapsulating the local device simulation model includes: encapsulating a simulation motor assembly used for device driving, arranging device sensing simulation models matching the reality, and creating input and output trigger functions;

is configured to build a communication interface between the local device simulation model, and the local master control server and the local management and control system;

is configured to calibrate input and output ports of the local device simulation model by building communication with the virtual controller; and is configured to preliminarily debug a process control logic of the local management and control system, and finally forming the local production line twin.

Optionally, the system debugging module is configured to perform local off-line simulation debugging on the local production line twin by using process control of a local management and control system; is also configured to mark the local component twin subjected to the local off-line simulation debugging; and is also configured to replace the marked local component twin with a corresponding entity component;

is configured to simulate executions of device remote fault diagnosis and maintenance by randomly generating a device fault in the local production line twin to implement fault detection debugging and processing; and is configured to, when the corresponding local component twin is subjected to the local off-line simulation debugging, replace the local component twin with the corresponding entity component; and is configured to, when the local component twin is not subjected to the local off-line simulation debugging, adjust parameters of the local component twin again.

Specifically, the hardware-in-the-loop debugging module is specifically configured to select a model of the local master control server and a corresponding communication protocol, determine input/output devices and a point location address, and design a control program;

is configured to burn the control program, build communication between the local device twin and the local master control server, and bind a point location;

is configured to determine a control requirement and configure the control program through execution components and process parameters of the remote device;

is configured to formulate and operate a simulation experiment, drive the local production line twin through an instruction issued by the local master control server, and simulate process control of order delivery;

is configured to receive, by the local master control server, a sensing signal of each local component twin, and distribute and transmit the signal to each remote controller through industrial Ethernet;

is configured to, after receiving the sensing signal, output, by the remote controller, an execution signal according to a control program logic and upload the signal to the local master control server;

is configured to forward, by the local master control server, the execution signal to the local component twin to execute model action control; and is configured to, after debugging and verification, obtain the finally optimized control program.

Optionally, the device-in-the-loop debugging module is specifically configured to transmit, by the local device twin, the sensing trigger signal to the local master control server;

is configured to forward, by the local master control server, the sensing trigger signal to the remote controller by using a virtual-real synchronization technology and an industrial Ethernet communication technology;

is configured to, after receiving the sensing trigger signal, execute, by the remote controller, the control program logic, and issue an actuator control signal to the remote device; and is configured to delay, by the remote controller, to issue the actuator control signal to the remote device, and eliminate delay of industrial Ethernet communication between the remote controller and the local master control server by a 5G technology.

The present invention has the beneficial effects that: an approximate physical simulation method of distributed hardware-in-the-loop (physical controller-in-the-loop) is used in the approximate physical simulation integrated debugging method based on digital twinning to perform distributed parallel debugging and verification on the production line, the local device twin is debugged first, the local component twin corresponding to the successfully debugged local device twin is replaced with the entity component, then the whole local device twin is gradually replaced with the entity device, and the whole production line is replaced finally, thus avoiding a loss caused by an error in direct operation on an entity during debugging. Since the local component twin after being successfully debugged is replaced with the entity component, when a problem occurs after replacement, only the local component twin needs to be debugged and optimized again, thus saving time and reducing cost. Multiple remote devices are remotely connected together through the communication of the industrial network to realize distributed parallel debugging, so that problems can be found and solved early, thus solving shortages of serial development of current production line, shortening a cycle of system integrated debugging and verification, and reducing development cost. The approximate physical simulation integrated debugging method based on digital twinning implements distributed parallelization of production line integrated debugging by the industrial network and a virtual object, which improves a quality of iterative optimization, shortens a cycle of debugging and verification, reduces a cost, reduces or avoids an unnecessary loss, reduces a development cycle and a cost of serial design, and can also improve a confidence coefficient of simulation debugging.

The device-in-the-loop debugging step of the approximate physical simulation integrated debugging method based on digital twinning does not require synchronous debugging, but the local device twin delays to issue the sensing trigger signal to the remote device, so that the local device twin is operated ahead of the remove device, and the purpose is to ensure that local monitoring personnel can find a control logic error earlier than remote personnel and take an evasive measure in time.

Pure entity debugging has the following shortcomings: it is necessary to wait for completing design of an entity object and writing of a control system logic before entity debugging, resulting in waiting waste; an automation device of the production line usually comes from manufacturers from various regions, so that it is necessary to wait for integration of the whole line before integrated debugging of the whole line, and it is impossible to remotely integrate for debugging; and mechanical design and manufacture of the production line, building of the control system, and implementation of the local management and control system are a serial process, and contain each other. Pure entity debugging in each stage may lead to stagnation of follow-up work and prolong the development cycle; direct pure entity debugging in a workshop may inevitably lead to a design error, a logic error, a debugging error, and other problems, resulting in a loss caused by misoperation of a mechanical device, and even a more serious error which results in an irreversible consequence; debugging and iterating for many times is time-consuming and energy-intensive, thus being not conducive to iterative optimization of the control system. Compared with the pure entity debugging, the approximate physical simulation integrated debugging method based on digital twinning can avoid the above shortcomings.

Pure virtual simulation debugging has the following shortcomings: a confidence coefficient of a result of pure virtual debugging is low; the pure virtual simulation debugging is to control a virtual production line by writing a model behavior logic through a simulation platform, which can debug and iteratively optimize a process logic of the local management and control system and a performance of the production line for many times, but cannot debug and verify whether a real control system can drive a physical production line correctly and reasonably; when the production line has a complex process logic and is highly automated, it is difficult to implement the model behavior logic through the simulation platform; and after design of an actual production line is adjusted, the behavior logic written by the simulation model also needs to be changed accordingly, which cannot meet a design process of iterative optimization of the entity device. Compared with pure virtual debugging, the approximate physical simulation integrated debugging method based on digital twinning can avoid the above shortcomings.

Different from the pure entity debugging and the pure virtual debugging, hardware-in-the-loop simulation is used in the approximate physical simulation integrated debugging method based on digital twinning to implement distributed integrated debugging of the virtual object and the entity object before field deployment of the production line by an industrial Ethernet+TCP/IP technology. If the entity device is still in a manufacturing stage, the entity device may be replaced with the local device twin and the action script of the local device twin may be replaced with the actual control program to debug and verify the system logic (hardware-in-the-loop); and if some entity devices are completely assembled, and the control program has avoided the errors after virtual debugging for many times, these entity devices may be synchronously incorporated into the simulation debugging (distributed device-in-the-loop), so that an original serial design mode may be optimized into parallel processing, with the development progress, a confidence coefficient after repeated debugging and iteration will also be gradually increased, and meanwhile, some losses are avoided, the development cycle is shortened, and the cost is reduced. The debugging method supports logics of the control system and the local management and control system debugged and iteratively optimized for many times, execution of the local device twin may be controlled by the iterated control program, and the local device twin may be quickly rebuilt by the three-dimensional model after iterative design of the device. The local device twin debugged in a design stage can also be used for debugging in a subsequent maintenance stage of the production line, thus making full use of resources and reducing redundant waste.

DETAILED DESCRIPTION OF THE PREFERRED EMBODIMENTS

Figure 1:
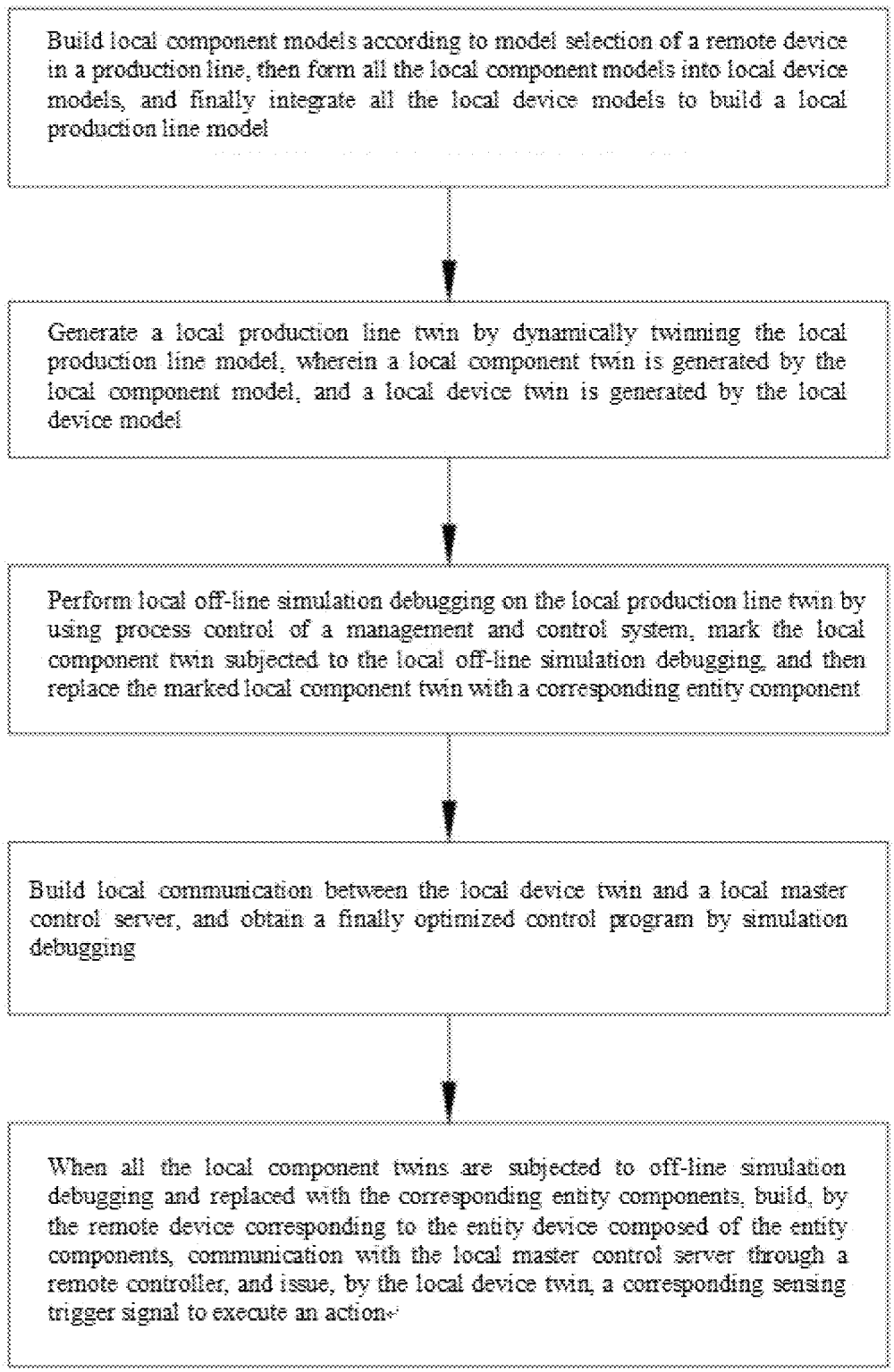
FIG. 1 is a flow chart in an embodiment of the present invention.

The implementations of the present invention are described in detail hereinafter. Examples of the implementations are shown in the accompanying drawings, wherein the same or similar reference numerals throughout the accompanying drawings denote the same or similar elements or elements having the same or similar functions. The implementations described hereinafter with reference to the accompanying drawings are exemplary and are only used to explain the present invention, but should not be understood as limiting the present invention.

The following disclosure provides many different implementations or examples for implementing different structures of the implementations of the present invention. In order to simplify the disclosure of the implementations of the present invention, the components and the settings of specific examples are described below. Certainly, they are only examples and are not intended to limit the present invention. In addition, the implementations of the present invention may repeat the reference numerals and/or reference letters in different examples, and such repetition is for the purpose of simplification and clarification, and does not itself indicate the relationship between the various implementations and/or settings discussed. In addition, the implementations of the present invention provide examples of various specific processes and materials, but those of ordinary skills in the art can recognize the application of other processes and/or the use of other materials.

An approximate physical simulation integrated debugging method based on digital twinning is described below with reference to FIG. 1 and FIG. 2, which includes the following steps of:

a production line simulation model building step: building local component simulation models according to model selection of a remote device in a production line, then forming all the local component simulation models into local device simulation models, and finally integrating all the local device simulation models to build a local production line simulation model;

a twinning step: generating a local production line twin by dynamically twinning the local production line simulation model, wherein a local component twin is generated by the local component simulation model, and a local device twin is generated by the local device simulation model;

a system debugging step: performing local off-line simulation debugging on the local production line twin by using process control of a local management and control system, marking the local component twin subjected to the local off-line simulation debugging, and then replacing the marked local component twin with a corresponding entity component;

a hardware-in-the-loop debugging step: building local communication between the local device twin and a local master control server, and obtaining a finally optimized control program by simulation debugging; and a device-in-the-loop debugging step: when all the local component twins are subjected to off-line simulation debugging and replaced with the corresponding entity components, building, by the remote device corresponding to the entity device composed of the entity components, communication with the local master control server through a remote controller, and issuing, by the local device twin, a corresponding sensing trigger signal to the remote device to execute an action, wherein the local device twin delays to transmit the sensing trigger signal, so that the local device twin acts ahead of the remote device.

An approximate physical simulation method of distributed hardware-in-the-loop (physical-controller-in-the-loop) is used in the approximate physical simulation integrated debugging method based on digital twinning to perform distributed parallel debugging and verification on the production line, the local device twin is debugged first, the local component twin corresponding to the successfully debugged local device twin is replaced with the entity component, then the whole local device twin is gradually replaced with the entity device, and the whole production line is replaced finally, thus avoiding a loss caused by an error in direct operation of an entity during debugging. Since the local component twin after being successfully debugged is replaced with the entity component, when a problem occurs after replacement, only the local component twin needs to be debugged and optimized again, thus saving time and reducing cost. Multiple remote devices are remotely connected together through the communication of the industrial network to realize distributed parallel debugging, so that problems can be found and solved early, thus solving shortage of serial development of current production line, shortening a cycle of system integrated debugging and verification, and reducing a development cost. The approximate physical simulation integrated debugging method based on digital twinning implements distributed parallelization of production line integrated debugging by the industrial network and a virtual object, which improves a quality of iterative optimization, shortens a cycle of debugging and verification, reduces a cost, reduces or avoids an unnecessary loss, reduces a development cycle and a cost of serial design, and can also improve a confidence coefficient of simulation debugging.

The device-in-the-loop debugging step of the approximate physical simulation integrated debugging method based on digital twinning does not require synchronous debugging, but the local device twin delays to issue the sensing trigger signal to the remote device, so that the local device twin is operated ahead of the remove device, and the purpose is to ensure that local monitoring personnel can find a control logic error earlier than remote personnel and take an evasive measure in time.

Pure entity debugging has the following shortcomings: it is necessary to wait for completing design of an entity object and writing of a control system logic before entity debugging, resulting in waiting waste; a production line automation device usually comes from manufacturers from various regions, so that it is necessary to wait for integration of the whole line before integrated debugging of the whole line, and it is impossible to remotely integrate for debugging; and mechanical design and manufacture of the production line, building of the control system, and implementation of the local management and control system are a serial process, and contain each other. Pure entity debugging in each stage may lead to stagnation of follow-up work and prolong the development cycle; direct pure entity debugging in a workshop may inevitably lead to a design error, a logic error, a debugging error, and other problems, resulting in a loss caused by misoperation of a mechanical device, and even a more serious error which results in an irreversible consequence; debugging and iterating for many times is time-consuming and energy-intensive, thus being not conducive to iterative optimization of the control system. Compared with pure entity debugging, the approximate physical simulation integrated debugging method based on digital twinning can avoid the above shortcomings.

Pure virtual simulation debugging has the following shortcomings: a confidence coefficient of a result of pure virtual debugging is low; the pure virtual simulation debugging is to control a virtual production line by writing a model behavior logic through a simulation platform, which can debug and iteratively optimize a process logic of the local management and control system and a performance of the production line for many times, but cannot debug and verify whether a real control system can drive a physical production line correctly and reasonably; when the production line has a complex process logic and is highly automated, it is difficult to implement the model behavior logic through the simulation platform; and after design of an actual production line is adjusted, the behavior logic written by the simulation model also needs to be changed accordingly, which cannot meet a design process of iterative optimization of the entity device. Compared with pure virtual debugging, the approximate physical simulation integrated debugging method based on digital twinning can avoid the above shortcomings.

Different from the pure entity debugging and the pure virtual debugging, hardware-in-the-loop simulation is used in the approximate physical simulation integrated debugging method based on digital twinning to implement distributed integrated debugging of the virtual object and the entity object before field deployment of the production line by an industrial Ethernet+TCP/IP technology. If the entity device is still in a manufacturing stage, the entity device may be replaced with the local device twin and the action script of the local device twin may be replaced with the actual control program to debug and verify a system logic (hardware-in-the-loop); and if some entity devices are completely assembled, and the control program has avoided the errors after virtual debugging for many times, these entity devices may be synchronously incorporated into the simulation debugging (distributed device-in-the-loop), so that an original serial design mode may be optimized into parallel processing, with the development progress, a confidence coefficient after repeated debugging and iteration will also be gradually increased, and meanwhile, some losses are avoided, the development cycle is shortened, and the cost is reduced. The debugging method supports logics of the control system and the local management and control system debugged and iteratively optimized for many times, execution of the local device twin may be controlled by the iterated control program, and the local device twin may be quickly rebuilt by the three-dimensional model after iterative design of the device. The local device twin debugged in a design stage can also be used for debugging in a subsequent maintenance stage of the production line, thus making full use of resources and reducing redundant waste.

For example, the production line simulation model building step specifically includes:

firstly, building general three-dimensional CAD models for key elements of an automatic production line according to the model selection of the remote device in the production line;

then, processing the general three-dimensional CAD model with larger numbers of vertices and patches by simplifying, replacing, or deleting to obtain a lightweight local component simulation model;

then, building a clear model hierarchical structure among the local component simulation models; and finally, according to device resource allocation, workshop layout planning, and process path planning, integrating all the local component simulation models and model hierarchical structures to form the local device simulation model;

the twinning step specifically includes:

firstly, generalizing and encapsulating the local device simulation model based on input and output control of a virtual controller, wherein the generalizing and encapsulating the local device simulation model includes: encapsulating a simulation motor assembly used for device driving, arranging device sensing simulation models matching the reality, and creating input and output trigger functions;

then, building a communication interface between the local device simulation model, and the local master control server and the local management and control system;

then, calibrating input and output ports of the local device simulation model by building communication with the virtual controller; and finally, preliminarily debugging a process control logic of the local management and control system, and finally forming the local production line twin.

A digital twinning technology is used in the approximate physical simulation integrated debugging method based on digital twinning to digitally model a plurality of remote devices distributed in different regions to implement digital integration of the remote devices first, and then whole line is planned to obtain the local production line simulation model. Then, according to key information of the entity device, such as process requirements, motion parameters, motion logic, etc., a ladder diagram or graphical programming of a virtual controller is used in a digital twin platform to quickly implement a control logic, thus implementing dynamic twinning of the whole line.

The virtual controller is preferably a soft PLC, and an input/output signal of the local device twin is an output/input signal from a perspective of control by the virtual controller control, and the signal is mainly used for controlling a driver to implement a corresponding action according to specific parameters. The action of the digital model is driven according to different types of input and output values, which requires to pre-encapsulate a corresponding function and endow the simulation model with an internal action logic, so as to meet a requirement of controlling the local device twin of the virtual controller. The device sensing simulation model is used for simulating a sensing trigger effect of an actual device and matching with control of the sensing input signal programmed by the ladder diagram of the virtual controller. The input/output trigger function can implement digital encapsulation of related input/output device controlled by the entity, such as a change-over switch, an inching switch, a signal indicator, an actuator, etc.

Communication is built through the virtual controller, and the control logic of the digital device is simply implemented, which is used for off-line simulation to verify an accuracy of the production line twin, thus ensuring that input and output components of each digital device can be operated correctly.

It is worth noting that the system debugging step specifically includes:

firstly, performing simulation delivery and execution of an order on the local production line twin under process control of the local management and control system, so as to implement order delivery debugging and production process monitoring;

then, simulating executions of device remote fault diagnosis and maintenance by randomly generating a device fault in the local production line twin to implement fault detection debugging and processing; and finally, when the corresponding local component twin is subjected to the local off-line simulation debugging, replacing the local component twin with the corresponding entity component; and when the local component twin is not subjected to the local off-line simulation debugging, adjusting parameters of the local component twin again.

Some local component twins are subjected to various debugging, so that these local component twins may be replaced with the entity components, and whole line system debugging is performed more realistically in a virtuality-reality crossed semi-physical simulation mode, thus improving a confidence coefficient of a debugging result.

Optionally, the hardware-in-the-loop debugging step specifically includes:

firstly, selecting a model of the local master control server and a corresponding communication protocol, determining input/output devices and a point location address, and designing a control program;

then, burning the control program, building communication between the local device twin and the local master control server, and binding a point location;

then, determining a control requirement and configuring the control program through execution components and process parameters of the remote device;

then, formulating and operating a simulation experiment, driving the local production line twin through an instruction issued by the local master control server, and simulating process control of order delivery; receiving, by the local master control server, a sensing signal of each local component twin, and distributing and transmitting the signal to each remote controller through industrial Ethernet; after receiving the sensing signal, outputting, by the remote controller, an execution signal according to a control program logic and uploading the signal to the local master control server, and then forwarding, by the local master control server, the execution signal to the local component twin to execute model action control; and finally, after debugging and verification, obtaining the finally optimized control program.

When the simulation experiment is formulated, in order to create necessary environmental conditions for operating the control program, the input signal of the controller is simulated in the local production line twin in the digital twin platform to simulate the output signal, and the signal is transmitted to the hardware controller through network interface wiring. The control program feeds the output signal back to the digital twin platform to implement closed-loop control debugging. When the simulation experiment is operated, whether the control logic is correct is verified, a result is outputted, and whether the result meets a requirement is analyzed. Otherwise, a PDCA (Plan, Do, Check, Act) cycle is executed repeatedly, and the control program is optimized iteratively. After the debugging is verified to be correct, the control program will be archived for reference during on-site integrated debugging of the whole line. After the control logic of each device is iterated through the PDCA cycle, the finally optimized program is archived and burned into the remote device controller, and finally debugging, iteration, optimization and verification of the control logic of all devices in the whole line are completed.

Specifically, the device-in-the-loop debugging step specifically includes:

firstly, transmitting, by the local device twin, the sensing trigger signal to the local master control server, and forwarding, by the local master control server, the sensing trigger signal to the remote controller by using a virtual-real synchronization technology and an industrial Ethernet communication technology; and then, after receiving the sensing trigger signal, executing, by the remote controller, the control program logic, and issuing an actuator control signal to the remote device, and after receiving the actuator control signal, executing, by the remote device, an action;

wherein, the remote controller delays to issue the actuator control signal to the remote device, and eliminates delay of industrial Ethernet communication between the remote controller and the local master control server by a 5G technology.

The actuator control signals include a motor start-stop signal and a servo motor pulse and cylinder enable signal. The above step can simultaneously drive the local device twin and the remote device to achieve a virtual-real synchronization effect; can also view operation of a distributed device in a three-dimensional scene, so as to implement three-dimensional visual monitoring of the remote device; and can also effectively avoid most logic errors through debugging of the system debugging step and the hardware-in-the-loop debugging step, and then the remote devices are connected in the loop one by one in a distributed way, or all devices in the production line are connected in the loop, so as to further debug and verify the motion logic of the control system and the process logic of the local management and control system, improve a confidence coefficient of distributed simulation integrated debugging, and provide effective reference for the follow-up.

Communication delay of the industrial Ethernet between the remote controller and the local master control server is eliminated as much as possible by using a 5G technology, which can ensure that the local device twin moves ahead, the action of the remote device can be interrupted in time when a problem is found in local monitoring, and a loss caused by misoperation of the entity device is avoided.

Figure 2:
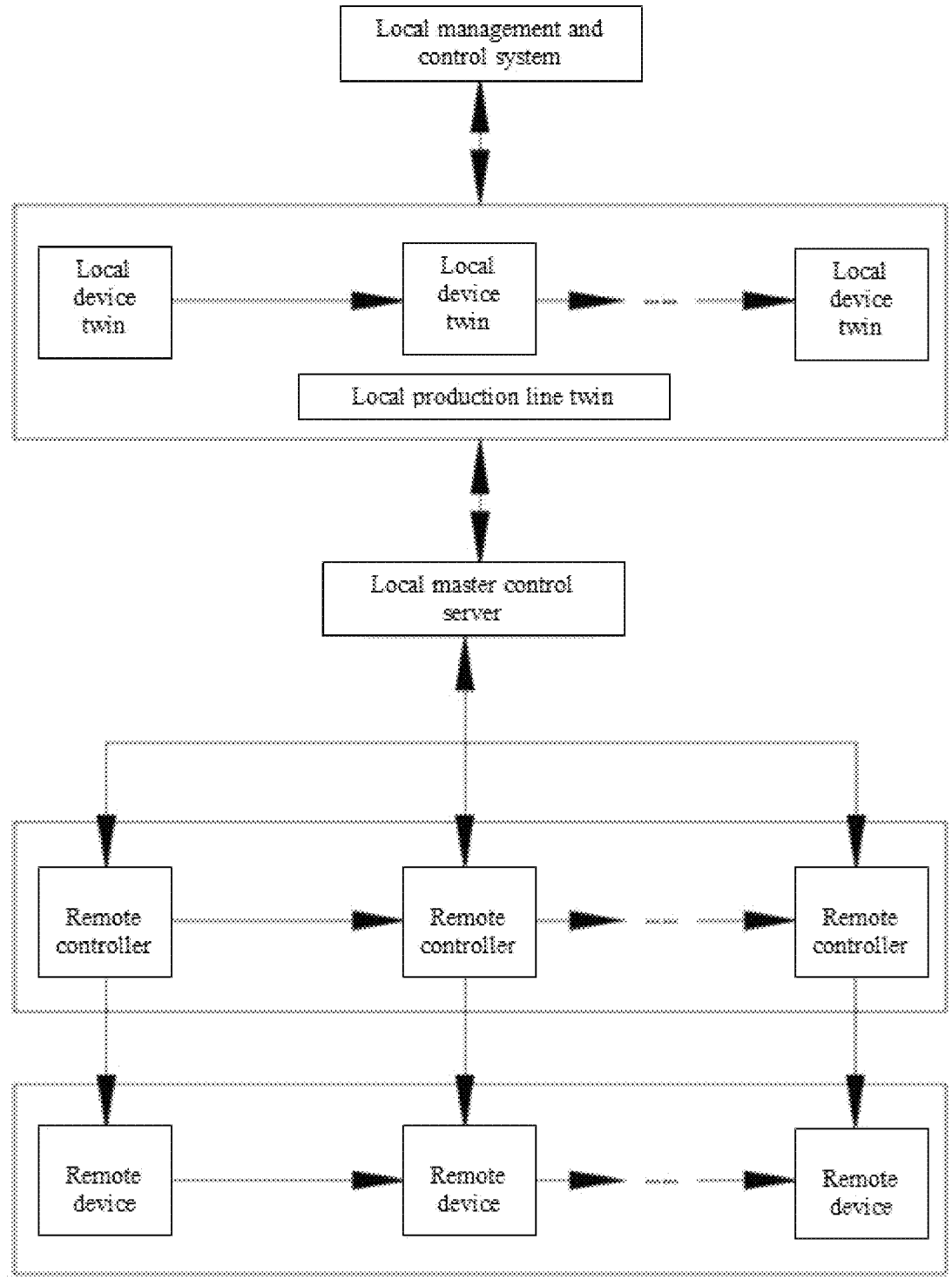
FIG. 2 is a configuration diagram of a device in an embodiment of the present invention.

As shown in FIG. 2, an approximate physical simulation integrated debugging system based on digital twinning includes a production line simulation model building module, a twinning module, a system debugging module, a hardware-in-the-loop debugging module, and a device-in-the-loop debugging module, wherein the production line simulation model building module is configured to build local component simulation models according to model selection of a remote device in a production line; is also configured to form all the local component simulation models into local device simulation models, and is also configured to integrate all the local device simulation models to build a local production line simulation model;

the twinning module is configured to generate a local production line twin by dynamically twinning the local production line simulation model; is also configured to generate a local component twin by the local component simulation model; and is also configured to generate a local device twin by the local device simulation model;

the system debugging module is configured to perform local off-line simulation debugging on the local production line twin by using process control of a local management and control system; is also configured to mark the local component twin subjected to the local off-line simulation debugging; and is also configured to replace the marked local component twin with a corresponding entity component;

the hardware-in-the-loop debugging module is configured to build local communication between the local device twin and a local master control server; and is also configured to obtain a finally optimized control program by simulation debugging; and the device-in-the-loop debugging module is configured to when all the local component twins are subjected to off-line simulation debugging and replaced with the corresponding entity components, build, by the remote device corresponding to the entity device composed of the entity components, communication with the local master control server through a remote controller; and is also configured to issue, by the local device twin, a corresponding sensing trigger signal to the remote device to execute an action, wherein the local device twin delays to issue the sensing trigger signal, so that the local device twin acts ahead of the remote device.

Firstly, the local device twin is quickly verified offline by using the system, so as to ensure a modeling accuracy of the local device twin, which is namely pure virtual off-line simulation debugging. Then, the remote controller is connected in the loop through the industrial Ethernet to convert the debugging into hardware-in-the-ring simulation debugging. Finally, after debugging and iterative optimization for many times, when the control program reaches an available condition, a debugging method of virtual and real synchronization is formed by combining the pure entity debugging and the hardware-in-the-loop debugging, and the remote device is monitored through the local device twin, so that a problem in the remote device is found and avoided in time. In addition, the process control of the local management and control system is debugged and iterated in the whole process.

The simulation integrated debugging may be applied from production line planning and design to engineering implementation and acceptance, and operation of the production line may be tested in advance, thus reducing losses generated by misoperation of a mechanical device caused by a design error, an operation error, and other errors during field debugging. The approximate physical simulation technology can not only make an engineer get some necessary data to improve understanding of a dynamic performance of the system, but also make the engineer visually see operation of the system. Logic verification and control testing of the entity controller may be directly executed in the simulation model during development without waiting for completely manufacturing the entity device, so as to quickly eliminate the design error, check whether the system meets an actual need in advance, examine a practicability of the physical production line system, implement automatic production line parallel design, shorten a cycle of design, debugging and verification of the production line, and reduce a development cost.

The above production line simulation model building module and the above twinning module are aimed at digital integration of the remote distributed device, and the hardware-in-the-loop debugging module and the device-in-the-loop debugging module perform virtuality-reality combined semi-physical simulation debugging and verification based on digital integration, thus implementing an integrated debugging function of distributed approximate physical simulation based on digital twinning. Devices provided by different manufacturers may be debugged online separately, in time-sharing, remotely, and with the whole line, thus being released from restrictions of region, site and time-space. Integrated debugging and verification of the device control logic and the production line control logic are completed in parallel before the whole line is integrated with the distributed device, thus implementing a parallelization process of debugging of a whole line of an intelligent workshop, reducing on-site debugging times, shortening a project cycle, and reducing a development cost.

Especially, the device of the production line usually comes from manufacturers of various regions, so that it is necessary to connect the device as a network node to the local master control server by using the industrial Ethernet, and perform the virtual debugging through the local simulation platform, thus implementing distributed approximate physical simulation integrated debugging of the remote device.

The approximate physical simulation integrated debugging method based on digital twinning depends on the following premises: a digital twinning platform with functions of three-dimensional digital design and three-dimensional visual virtual debugging is provided, and a physical engine is integrated to improve an authenticity of virtual-real mapping; the system may perform virtual equipment of a single device, and has functions of sensing trigger mechanism and soft controller, which may control an action of a simulation model through a ladder diagram or a script, and may debug the single device and the whole line system. The system and the automation device support a variety of mainstream communication protocols (OPC, Modbus, Profinet, TCP/IP, EtherNet/IP, etc.), which are used for implementing distributed debugging of time-sharing and remote interconnection.

For example, the production line simulation model building module is specifically configured to build general three-dimensional CAD models for key elements of an automatic production line according to the model selection of the remote device in the production line;

is configured to process the general three-dimensional CAD model with larger numbers of vertices and patches by simplifying, replacing, or deleting to obtain a lightweight local component simulation model;

is configured to build a clear model hierarchical structure among the local component simulation models; and is configured to, according to device resource allocation, workshop layout planning, and process path planning, integrate all the local component simulation models and model hierarchical structures to form the local device simulation model;

the twinning module is specifically configured to generalize and encapsulate the local device simulation model based on input and output control of a virtual controller, wherein the generalizing and encapsulating the local device simulation model includes: encapsulating a simulation motor assembly used for device driving, arranging device sensing simulation models matching the reality, and creating input and output trigger functions;

is configured to build a communication interface between the local device simulation model, and the local master control server and the local management and control system;

is configured to calibrate input and output ports of the local device simulation model by building communication with the virtual controller; and is configured to preliminarily debug a process control logic of the local management and control system, and finally forming the local production line twin.

The model selection of the remote device of the production line includes a stand-alone device, a logistics device, a conveying line, and a robot. Lightweight processing of the digital device model is implemented on the premise of not affecting a fidelity and an appearance of the digital device. A relative motion relationship between the components can clearly identified by building a clear hierarchical structure of the model.

It is worth noting that the system debugging module is configured to perform local off-line simulation debugging on the local production line twin by using process control of a local management and control system; is also configured to mark the local component twin subjected to the local off-line simulation debugging; and is also configured to replace the marked local component twin with a corresponding entity component;

is configured to simulate executions of device remote fault diagnosis and maintenance by randomly generating a device fault in the local production line twin to implement fault detection debugging and processing; and is configured to, when the corresponding local component twin is subjected to the local off-line simulation debugging, replace the local component twin with the corresponding entity component; and is configured to, when the local component twin is not subjected to the local off-line simulation debugging, adjust parameters of the local component twin again.

All functions of the approximate physical simulation integrated debugging system based on digital twinning may be simulated and debugged by relying on the local production line twin. A specific method is to simulate a corresponding situation in a corresponding local component twin by manually inputting an instruction or issuing an instruction by the system, and then debug and verify whether an execution effect of a corresponding function module in the local management and control system can meet requirements.

Optionally, the hardware-in-the-loop debugging module is specifically configured to select a model of the local master control server and a corresponding communication protocol, determine input/output devices and a point location address, and design a control program;

is configured to burn the control program, build communication between the local device twin and the local master control server, and bind a point location;

is configured to determine a control requirement and configure the control program through execution components and process parameters of the remote device;

is configured to formulate and operate a simulation experiment, drive the local production line twin through an instruction issued by the local master control server, and simulate process control of order delivery;

is configured to receive, by the local master control server, a sensing signal of each local component twin, and distribute and transmit the signal to each remote controller through industrial Ethernet;

is configured to, after receiving the sensing signal, output, by the remote controller, an execution signal according to a control program logic and upload the signal to the local master control server, is configured to forward, by the local master control server, the execution signal to the local component twin to execute model action control; and is configured to, after debugging and verification, obtain the finally optimized control program.

The above module implements the distributed hardware-in-the-loop debugging, and debugs and verifies the process control logic of the local management and control system again.

Specifically, the device-in-the-loop debugging module is specifically configured to transmit, by the local device twin, the sensing trigger signal to the local master control server;

is configured to forward, by the local master control server, the sensing trigger signal to the remote controller by using a virtual-real synchronization technology and an industrial Ethernet communication technology;

is configured to, after receiving the sensing trigger signal, execute, by the remote controller, the control program logic, and issue an actuator control signal to the remote device; and is configured to delay, by the remote controller, to issue the actuator control signal to the remote device, and eliminate delay of industrial Ethernet communication between the remote controller and the local master control server by a 5G technology.

When one remote device is completely assembled and a control program thereof is verified to be correct after debugging for many times, the remote device may be connected to in the loop, and controlled by the remote controller, and the local device twin issues the sensing trigger signal to execute the action, thus implementing visual virtual-real synchronous debugging.

A distributed hardware-in-the-loop debugging technology is used to perform logic verification and control testing of the remote controller in the local device twin. In addition, the whole process integrates the local management and control system, and debugs and verifies whether process logic design of the local management and control system meets process and customer requirements.

In the description of the present invention, the descriptions of the reference terms "one implementation", "some implementations", "schematic implementations", "examples", "specific examples", or "some examples" refer to that the specific features, structures, materials, or characteristics described in combination with the implementation or example are included in at least one implementation or example of the present invention. In the specification, the schematic expressions of the above terms do not necessarily refer to the same implementation or example. Furthermore, the specific features, structures, materials, or characteristics described may be combined in any one or more implementations or examples in a suitable manner.

The logic and/or step shown in the flow chart or described in other ways herein, such as the sequence list of executable instructions regarded as being used for implementing logic functions, can be specifically implemented in any computer-readable medium for use by or in combination with instruction execution system, apparatus or device (such as a computer-based system, a system including a processing module or other systems that can receive and execute the instructions from the instruction execution system, apparatus or device).

We claim:

1. An approximate physical simulation integrated debugging method based on digital twinning, comprising the following steps of:
    a production line simulation model building step: building local component simulation models according to model selection of a remote device in a production line, then forming all the local component simulation models into local device simulation models, and finally integrating all the local device simulation models to build a local production line simulation model;
    a twinning step: generating a local production line twin by dynamically twinning the local production line simulation model, wherein a local component twin is generated by the local component simulation model, and a local device twin is generated by the local device simulation model;
    a system debugging step: performing local off-line simulation debugging on the local production line twin by using process control of a local management and control system, marking the local component twin subjected to the local off-line simulation debugging, and then replacing the marked local component twin with a corresponding entity component;
    a hardware-in-the-loop debugging step: building local communication between the local device twin and a local master control server, and obtaining a finally optimized control program by simulation debugging; and
    a device-in-the-loop debugging step: when all the local component twins are subjected to off-line simulation debugging and replaced with the corresponding entity components, building, by the remote device corresponding to the entity device composed of the entity components, communication with the local master control server through a remote controller, and issuing, by the local device twin, a corresponding sensing trigger signal to the remote device to execute an action, wherein the local device twin delays to transmit the sensing trigger signal, so that the local device twin acts ahead of the remote device, and time delay is able to allow a local monitoring personnel to find a control logic error earlier than a remote personnel and take an evasive measure;
    wherein the device-in-the-loop debugging step further comprises:
        firstly, transmitting, by the local device twin, the sensing trigger signal to the local master control server, and forwarding, by the local master control server, the sensing trigger signal to the remote controller; and
        then, after receiving the sensing trigger signal, executing, by the remote controller, the control program logic, and issuing an actuator control signal to the remote device, and after receiving the actuator control signal, executing, by the remote device, an action.

2. The approximate physical simulation integrated debugging method based on digital twinning according to claim 1, wherein the production line simulation model building step specifically comprises:
    firstly, building general three-dimensional CAD models for key elements of an automatic production line according to the model selection of the remote device in the production line;
    then, processing the general three-dimensional CAD model with larger numbers of vertices and patches by simplifying, replacing, or deleting to obtain a lightweight local component simulation model;
    then, building a clear model hierarchical structure among the local component simulation models; and
    finally, according to device resource allocation, workshop layout planning, and process path planning, integrating all the local component simulation models and model hierarchical structures to form the local device simulation model;
    the twinning step specifically comprises:
    firstly, generalizing and encapsulating the local device simulation model based on input and output control of a virtual controller,
    wherein the generalizing and encapsulating the local device simulation model comprises: encapsulating a simulation motor assembly used for device driving, arranging device sensing simulation models matching the reality, and creating input and output trigger functions;
    then, building a communication interface between the local device simulation model, and the local master control server and the local management and control system;
    then, calibrating input and output ports of the local device simulation model by building communication with the virtual controller; and
    finally, preliminarily debugging a process control logic of the local management and control system, and finally forming the local production line twin.

3. The approximate physical simulation integrated debugging method based on digital twinning according to claim 2, wherein the system debugging step specifically comprises:
    firstly, performing simulation delivery and execution of an order on the local production line twin under process control of the local management and control system, so as to implement order delivery debugging and production process monitoring;
    then, simulating executions of device remote fault diagnosis and maintenance by randomly generating a device fault in the local production line twin to implement fault detection debugging and processing; and
    finally, when the corresponding local component twin is subjected to the local off-line simulation debugging, replacing the local component twin with the corresponding entity component; and when the local component twin is not subjected to the local off-line simulation debugging, adjusting parameters of the local component twin again.

4. The approximate physical simulation integrated debugging method based on digital twinning according to claim 3, wherein the hardware-in-the-loop debugging step specifically comprises:

firstly, selecting a model of the local master control server and a corresponding communication protocol, determining input/output devices and a point location address, and designing a control program;

then, burning the control program, building communication between the local device twin and the local master control server, and binding a point location;

then, determining a control requirement and configuring the control program through execution components and process parameters of the remote device;

then, formulating and operating a simulation experiment, driving the local production line twin through an instruction issued by the local master control server, and simulating process control of order delivery; receiving, by the local master control server, a sensing signal of each local component twin, and distributing and transmitting the signal to each remote controller through industrial Ethernet; after receiving the sensing signal, outputting, by the remote controller, an execution signal according to a control program logic and uploading the signal to the local master control server, and then forwarding, by the local master control server, the execution signal to the local component twin to execute model action control; and finally, after debugging and verification, obtaining the finally optimized control program.

5. The approximate physical simulation integrated debugging method based on digital twinning according to claim 4, wherein the remote controller delays to issue the actuator control signal to the remote device, and eliminates delay of industrial Ethernet communication between the remote controller and the local master control server by a 5G technology.

6. An approximate physical simulation integrated debugging system based on digital twinning, comprising a production line simulation model building module, a twinning module, a system debugging module, a hardware-in-the-loop debugging module, and a device-in-the-loop debugging module, wherein the production line simulation model building module is configured to build local component simulation models according to model selection of a remote device in a production line; is also configured to form all the local component simulation models into local device simulation models, and is also configured to integrate all the local device simulation models to build a local production line simulation model;

the twinning module is configured to generate a local production line twin by dynamically twinning the local production line simulation model; is also configured to generate a local component twin by the local component simulation model; and is also configured to generate a local device twin by the local device simulation model;

the system debugging module is configured to perform local off-line simulation debugging on the local production line twin by using process control of a local management and control system; is also configured to mark the local component twin subjected to the local off-line simulation debugging; and is also configured to replace the marked local component twin with a corresponding entity component;

the hardware-in-the-loop debugging module is configured to build local communication between the local device twin and a local master control server; and is also configured to obtain a finally optimized control program by simulation debugging; and the device-in-the-loop debugging module is configured to when all the local component twins are subjected to off-line simulation debugging and replaced with the corresponding entity components, build, by the remote device corresponding to the entity device composed of the entity components, communication with the local master control server through a remote controller; and is also configured to issue, by the local device twin, a corresponding sensing trigger signal to the remote device to execute an action, wherein the local device twin delays to issue the sensing trigger signal, so that the local device twin acts ahead of the remote device, and time delay is able to allow a local monitoring personnel to find a control logic error earlier than a remote personnel and take an evasive measure;

wherein the device-in-the-loop debugging module is further configured to:

firstly, transmit, by the local device twin, the sensing trigger signal to the local master control server, and forward, by the local master control server, the sensing trigger signal to the remote controller; and then, after receiving the sensing trigger signal, execute, by the remote controller, the control program logic, and issue an actuator control signal to the remote device, and after receiving the actuator control signal, execute, by the remote device, an action.

7. The approximate physical simulation integrated debugging system based on digital twinning according to claim 6, wherein the production line simulation model building module is specifically configured to build general three-dimensional CAD models for key elements of an automatic production line according to the model selection of the remote device in the production line;

is configured to process the general three-dimensional CAD model with larger numbers of vertices and patches by simplifying, replacing, or deleting to obtain a lightweight local component simulation model;

is configured to build a clear model hierarchical structure among the local component simulation models; and is configured to, according to device resource allocation, workshop layout planning, and process path planning, integrate all the local component simulation models and model hierarchical structures to form the local device simulation model;

the twinning module is specifically configured to generalize and encapsulate the local device simulation model based on input and output control of a virtual controller, wherein the generalizing and encapsulating the local device simulation model comprises: encapsulating a simulation motor assembly used for device driving, arranging device sensing simulation models matching the reality, and creating input and output trigger functions;

is configured to build a communication interface between the local device simulation model, and the local master control server and the local management and control system;

is configured to calibrate input and output ports of the local device simulation model by building communication with the virtual controller; and is configured to preliminarily debug a process control logic of the local management and control system, and finally forming the local production line twin.

8. The approximate physical simulation integrated debugging system based on digital twinning according to claim 7, wherein the system debugging module is specifically configured to perform simulation delivery and execution of an order on the local production line twin under process control of the local management and control system, so as to implement order delivery debugging and production process monitoring;

is configured to simulate executions of device remote fault diagnosis and maintenance by randomly generating a device fault in the local production line twin to implement fault detection debugging and processing; and is configured to, when the corresponding local component twin is subjected to the local off-line simulation debugging, replace the local component twin with the corresponding entity component; and is configured to, when the local component twin is not subjected to the local off-line simulation debugging, adjust parameters of the local component twin again.

9. The approximate physical simulation integrated debugging system based on digital twinning according to claim 8, wherein the hardware-in-the-loop debugging module is specifically configured to select a model of the local master control server and a corresponding communication protocol, determine input/output devices and a point location address, and design a control program;

is configured to burn the control program, build communication between the local device twin and the local master control server, and bind a point location;

is configured to determine a control requirement and configure the control program through execution components and process parameters of the remote device;

is configured to formulate and operate a simulation experiment, drive the local production line twin through an instruction issued by the local master control server, and simulate process control of order delivery;

is configured to receive, by the local master control server, a sensing signal of each local component twin, and distribute and transmit the signal to each remote controller through industrial Ethernet;

is configured to, after receiving the sensing signal, output, by the remote controller, an execution signal according to a control program logic and upload the signal to the local master control server, is configured to forward, by the local master control server, the execution signal to the local component twin to execute model action control; and is configured to, after debugging and verification, obtain the finally optimized control program.

10. The approximate physical simulation integrated debugging system based on digital twinning according to claim 9, wherein the device-in-the-loop debugging module is specifically configured to eliminate delay of industrial Ethernet communication between the remote controller and the local master control server by a 5G technology.

* * * * *